(12) United States Patent
Aronovich et al.

(10) Patent No.: US 10,176,106 B2
(45) Date of Patent: *Jan. 8, 2019

(54) CACHING MECHANISMS FOR INFORMATION EXTRACTED FROM APPLICATION CONTAINERS INCLUDING APPLYING A SPACE GUARD AND A TIME GUARD

(71) Applicant: INTERNATIONAL BUSINESS MACHINES CORPORATION, Armonk, NY (US)

(72) Inventors: Lior Aronovich, Thornhill (CA); Shibin I. Ma, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,544

(22) Filed: Feb. 24, 2017

(65) Prior Publication Data
US 2018/0246812 A1 Aug. 30, 2018

(51) Int. Cl.
*G06F 12/08* (2016.01)
*G06F 12/0888* (2016.01)
(Continued)

(52) U.S. Cl.
CPC ...... *G06F 12/0888* (2013.01); *G06F 12/0808* (2013.01); *G06F 12/128* (2013.01);
(Continued)

(58) Field of Classification Search
CPC ............ G06F 12/0888; G06F 12/0808; G06F 12/128; G06F 2212/6046; G06F 2212/621; G06F 2212/69
See application file for complete search history.

(56) References Cited

U.S. PATENT DOCUMENTS 9,122,562 B1   9/2015 Stickle
9,524,183 B1 * 12/2016 Phelan ................ G06F 9/45558
(Continued)

OTHER PUBLICATIONS

U.S. Appl. No. 15/441,535, filed Feb. 24, 2017.
U.S. Appl. No. 15/441,526, filed Feb. 24, 2017.

*Primary Examiner* — Glenn Gossage
(74) *Attorney, Agent, or Firm* — Griffiths & Seaton PLLC

(57) ABSTRACT

Caching extracted information from application containers by one or more processors. Upon extracting relevant information from a temporary container, the relevant information is cached at a container template level. A space guard is applied controlling an amount of storage consumed by the cached relevant information, and a time guard is applied controlling an expiration of the cached relevant information. The cached relevant information is maintained for injection into a working container. Applying the space guard includes defining a purge process for pruning or removing cached relevant information stored in the cache, and candidate files for the purge process may be identified using a predetermined criterion. Applying the time guard includes using a time metric defined in a profile of an information injection agent, where the time metric is based on one of a creation time, a last access time or a last modified time of the cached relevant information.

15 Claims, 9 Drawing Sheets

(51) Int. Cl.
*G06F 12/0808* (2016.01)
*G06F 12/128* (2016.01)

(52) U.S. Cl.
CPC ............... *G06F 2212/6046* (2013.01); *G06F 2212/621* (2013.01); *G06F 2212/69* (2013.01)

(56) References Cited

U.S. PATENT DOCUMENTS

| | | |
|---|---|---|
| 2015/0379287 A1 | 12/2015 | Mathur et al. |
| 2016/0162320 A1 | 6/2016 | Singh et al. |
| 2016/0378545 A1* | 12/2016 | Ho .................. G06F 9/50 718/107 |
| 2017/0168778 A1* | 6/2017 | Brandys ............... G06F 8/24 |
| 2017/0201597 A1* | 7/2017 | Narasimhan ......... H04L 67/327 |
| 2017/0322824 A1* | 11/2017 | Reuther ............... G06F 3/0604 |

\* cited by examiner

500

| INJECTION AGENT CONFIGURATION |
|---|
| INJECTION INFORMATION SOURCE LOCATION |
| INJECTION INFORMATION TARGET LOCATION |
| SPACE-RELATED CONFIGURATION |
| ENABLE SPACE GUARD |
| PURGE ALGORITHM |
| PURGE TRIGGER |
| PURGE GOAL |
| TIME-RELATED CONFIGURATION |
| ENABLE TIME GUARD |
| TIMER METRICS |
| EXPIRATION TIMER |
| INFORMATION SPECIFIC CONFIGURATION |
| CONFLICT RESOLVE LOGIC |

FIG. 5

CACHING MECHANISMS FOR INFORMATION EXTRACTED FROM APPLICATION CONTAINERS INCLUDING APPLYING A SPACE GUARD AND A TIME GUARD

CROSS-REFERENCE TO RELATED APPLICATIONS

This Application is related to U.S. application Ser. No. 15/441,526 and U.S. application Ser. No. 15/441,535, each filed on even date as the present Application.

BACKGROUND OF THE INVENTION

Field of the Invention

The present invention relates in general to computing systems and, more particularly, to various embodiments for providing application information management in a containerized environment.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continues to proliferate throughout society.

Application "containerization" is an operating system level (OS-level) virtualization method for deploying and running distributed applications without launching an entire virtual machine (VM) for each application. Instead, multiple isolated systems are run on a single control host and access a single operating system kernel. The application containers hold the components such as files, libraries, and environment configuration necessary to run the desired software. Containerization may result in efficiency gains in memory, processing, and storage compared to traditional virtualization.

SUMMARY OF THE INVENTION

Various embodiments for caching extracted information from application containers by one or more processors, are provided. In one embodiment, by way of example only, a method comprises, upon extracting relevant information from a temporary container, caching the relevant information at a container template level; applying a space guard controlling an amount of storage consumed by the cached relevant information; applying a time guard controlling an expiration of the cached relevant information; and maintaining the cached relevant information for injection into a working container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a block diagram depicting an exemplary required data structure of components, in accordance with aspects of the present invention;

DETAILED DESCRIPTION OF THE DRAWINGS

Figure 1:
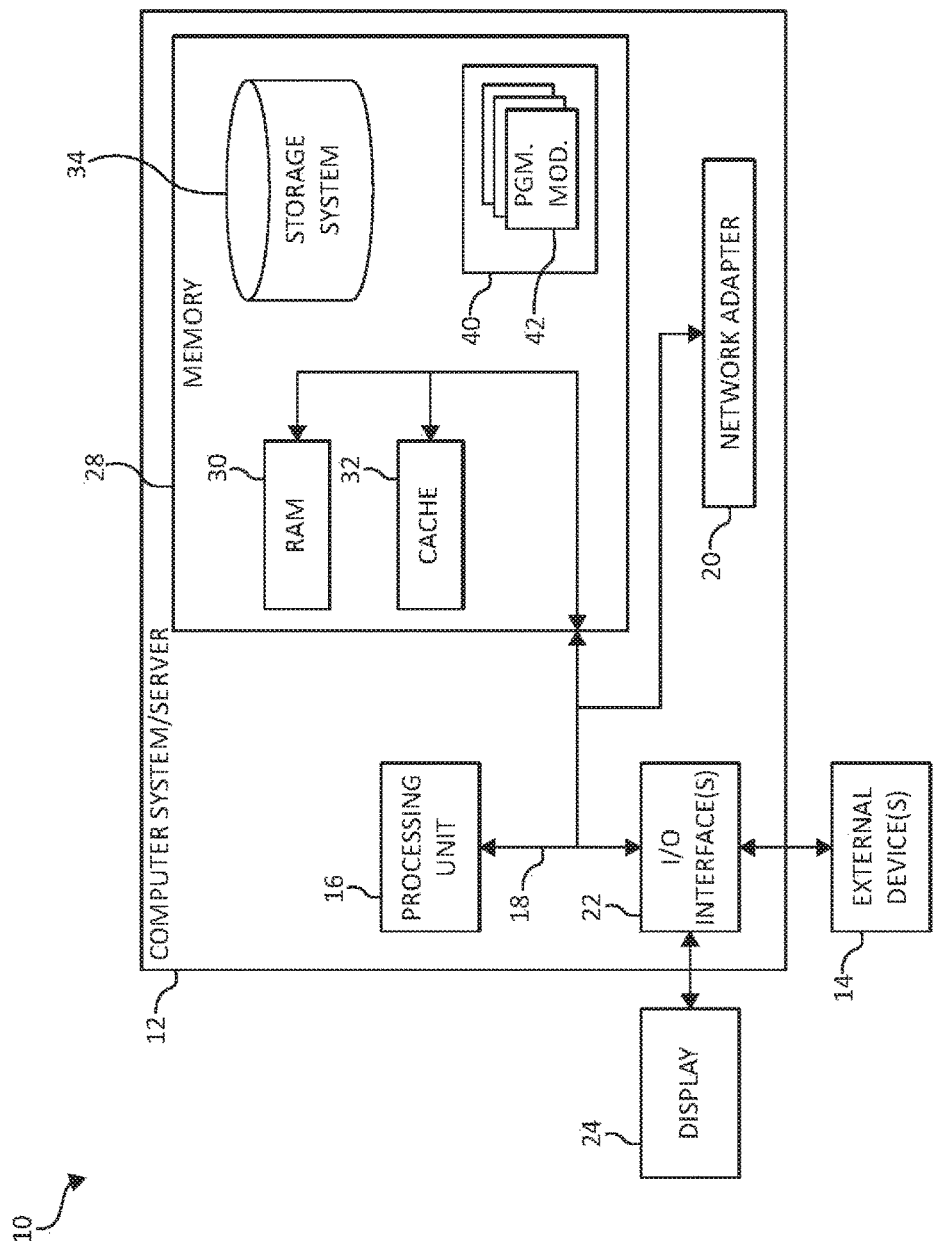
FIG. 1 is a block diagram depicting an exemplary computing node according to an embodiment of the present invention.

As aforementioned, application "containerization" is an operating system level (OS-level) virtualization method for deploying and running distributed applications without launching an entire virtual machine (VM) for each application. Instead, multiple isolated systems are run on a single control host and access a single operating system kernel. The application containers hold the components such as files, libraries, and environment configuration necessary to run the desired software. Application containers place less strain on the overall computing resources available, as they share the operating system kernel, and may also share resources such as storage and networking.

Containerization may result in efficiency gains in memory, processing, and storage compared to traditional virtualization. Because application containers do not have the overhead required by VM's, it is possible to support many more containers on the same infrastructure. Application containers may also be migrated to other computing environments, such as computing systems, clouds, or other environments without requiring code changes. Accordingly, a potential benefit of application containers includes portability across various platforms.

Thus, application containers enable users to create, execute, isolate and scale applications in a light-weight, flexible and portable manner, and, as aforementioned, users can deploy these application containers in a variety of computing environments and/or on multiple computing devices. For example, a user may encapsulate a traditional host based application and its dependencies such as libraries, configuration files, entitlement information, etc. into one application container or a group of application containers.

These containers can be deployed to a variety of contexts such as a private computing cluster or a public cloud.

By design, containers are isolated from the deployment environment in which they are running in aspects such as their namespaces, available resources, file system, environment variables and configuration. However, there are cases where it is useful to share information between the container environment and the host environment in which it runs for various purposes. Following are two example use cases illustrating various techniques for resolving this issue and further challenges created in doing so.

One example is to apply host level data access control inside application containers. Some embodiments of application containers support data volumes mounted inside containers and decouple the lifecycle of data from the lifecycle of the containers, to enable applications running inside the container to persist data. However, the isolation of a container, and its access to data volumes from the host environment it runs in, presents a problem for applying access control to data on such volumes. For instance, in POSIX-based file systems, security and access control are primarily based on file permissions: a system administrator can give different read, write and execute privileges to the owner of the file, the assigned group of file, and other users. Specific access control permissions can thereby be granted to individual users in addition to groups of users, and advanced permissions also exist to enable users to run an application with the permissions of the application's owner or group, respectively.

Unfortunately, due to the isolated nature of an application container, the user namespace inside the container is inherently different from the user space of the host in which the container is running. Therefore, when a host data volume is mounted inside an application container, the file permissions and access control rules, which are carefully designed and enforced for host users, will be compromised or completely invalidated, inside the container. Failure to correctly interpret and enforce host access control imperatives inside the container presents a problem for implementing data security and access control in containers.

Another example is dynamic configuration of applications running inside containers. Many applications require configuration information to be partly or wholly calculated dynamically based on information retrieved from the host. Configuration information stored inside containers is, by design, static and isolated from the host environment. Therefore, a further case of the above problem is how to combine the configuration information inside a container with host level information to calculate dynamic configuration information for applications running inside a container.

The mechanisms of the illustrated embodiments hence provide solutions to the underlying dilemma discussed in which a variety of runtime information must be calculated based on information inside a container and from the host environment, and such runtime information must be provided back into the container prior to the execution of the applications inside the container. These mechanisms include such functionality as to start a transient application container of the same container template that would be used by the actual working container, extract and calculate relevant information according to the specification in the application template and inject this information back into the actual working container. This extracted information from the temporary container then may be cached at the container template level, instead of an application template level or an application instance level. Additionally, a space guard and a time guard may be implemented to ensure the disk consumption and information recency of the cached information are within reasonable bounds.

Hence, the mechanisms described herein enable the creation and orchestration of application containers that are context-aware of their deployment environment. As will be explained in detail below, by carefully implementing the cache mechanisms of the present invention, the systems and methods taught herein may efficiently and accurately propagate runtime information from the deployment environment into any given application container.

The advantage of such functionality includes (1) High Efficiency: the cache mechanism taught herein may reduce the number of temporary containers to be launched. (2) High Effectiveness: as described herein, the container template level cache can effectively become the source of injected information. (3) High Reusability: the cached information may be reused multiple times for different purposes and for different application instances. (4) Pluggable Functionality: the time guard and space guard taught herein are built-in to the described mechanisms, but can be replaced by other components.

Additional aspects of the present invention and attendant benefits will be further described, following.

It should be noted that the term "application container", as used herein, generally refers to any software technology that provides an encapsulated application in a contained environment that is isolated from other applications running within the operating system. Application containers are generally more light-weight, compared to traditional virtual machines which usually host an entire operating system. Application containers, on the other hand, reuse the host operating system kernel, and possibly other resources such as storage and networking. An application software stack and all its required components are packaged into a container template, which is a basis for creating running containers based on the template. These templates may be stored in a container templates library that is hosted either locally or can be retrieved remotely using application programming interfaces.

In addition, the term "application", as used herein, generally refers to any type or form of software, file, and/or executable code that may be installed, run, deployed and/or implemented on a computing system. Examples of applications include, without limitation, internet applications, database systems, communication systems, text and number processing applications, etc.

Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or capable of performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus, a peripheral bus, an accelerated graphics port or interface, and a processor bus or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disk-read only memory (CD-ROM), digital versatile disk-read only memory (DVD-ROM) or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

In the context of the present invention, and as one of skill in the art will appreciate, various components depicted in FIG. 1 may be used in deploying the application container functionality taught herein. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
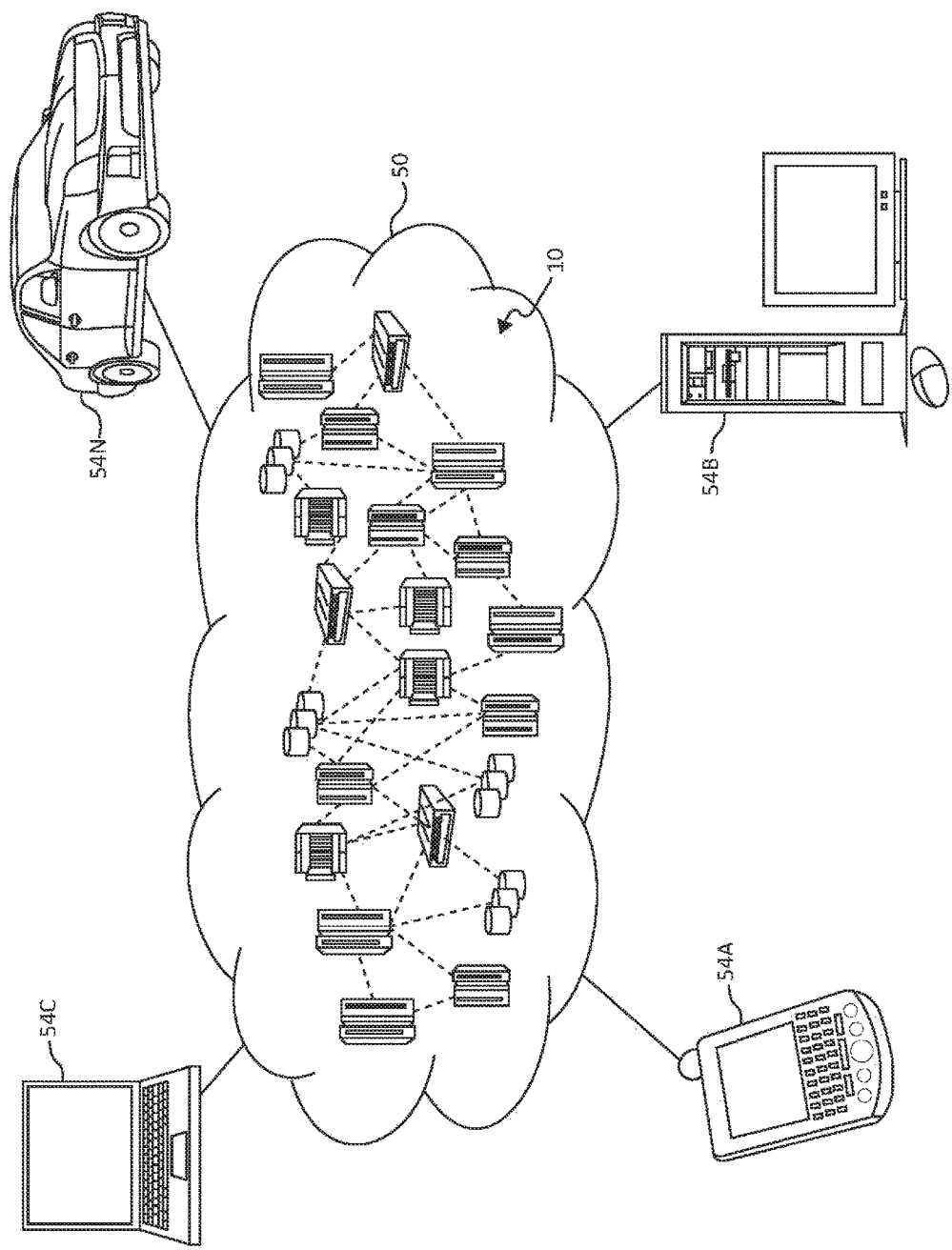
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
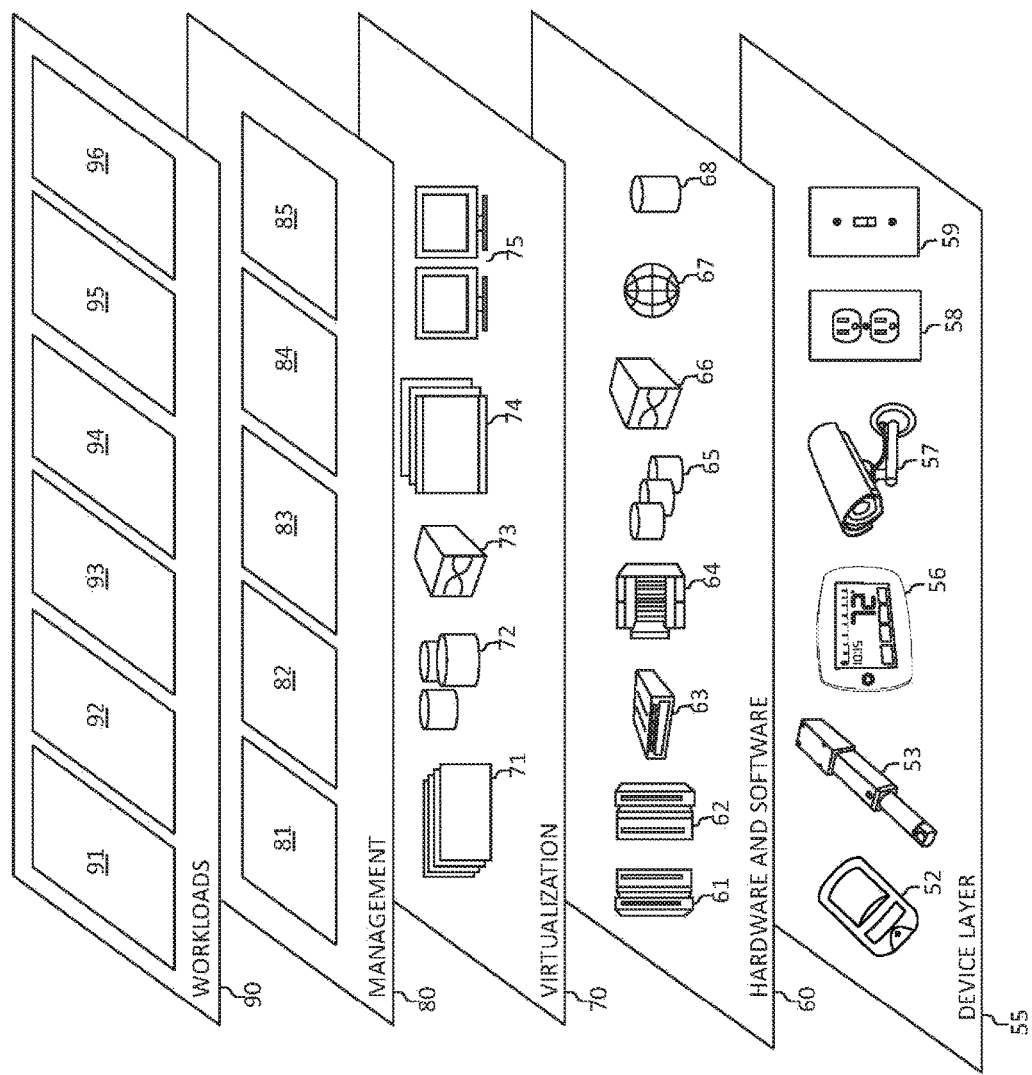
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various information extraction and aggregation functions 96. In addition, information extraction and aggregation functions 96 may include such operations as analyzing certain data and injection of the certain data into application container operations as will be further described. One of ordinary skill in the art will appreciate that the information extraction and aggregation functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
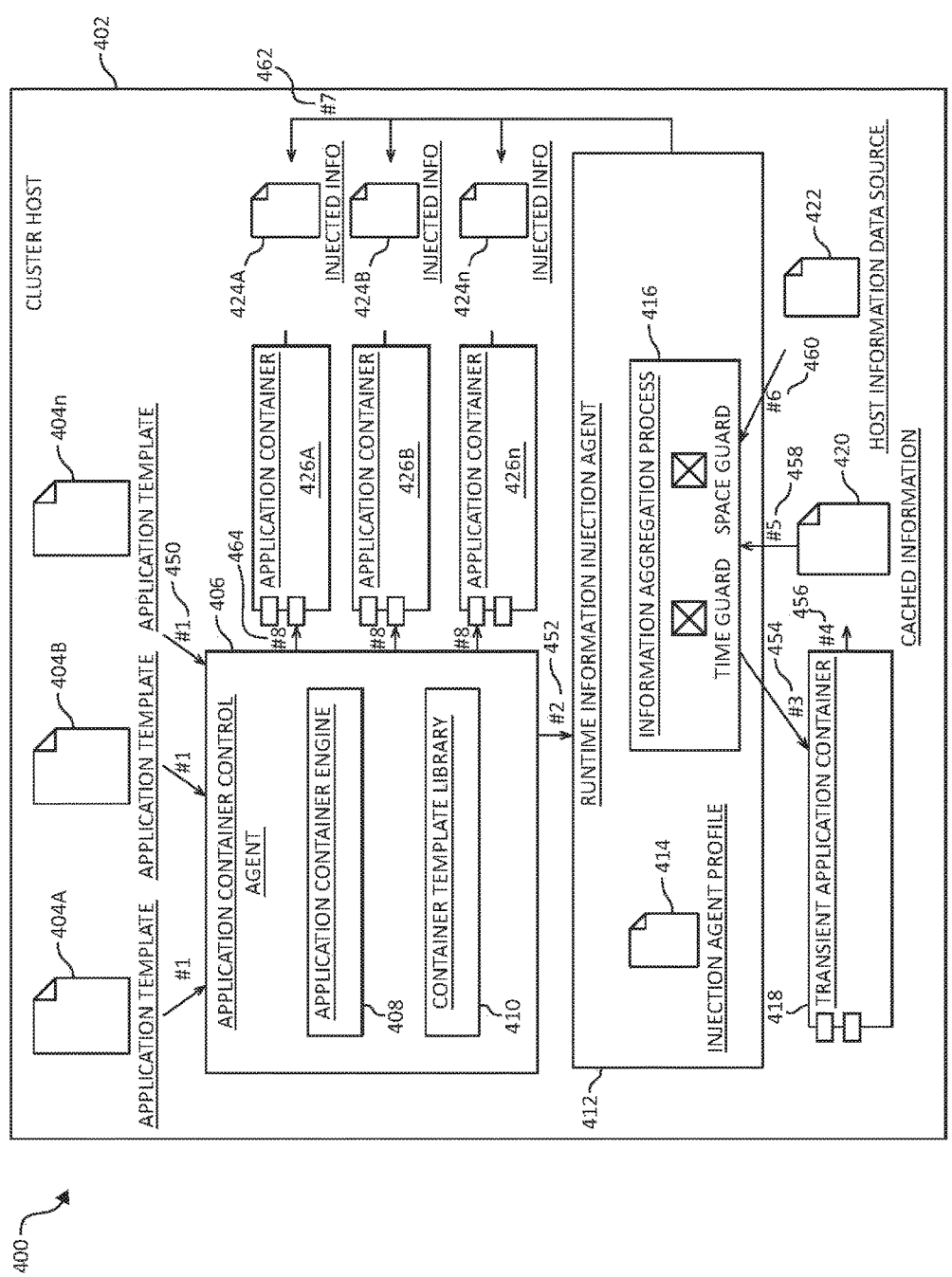
FIG. 4 is a combination block/flowchart diagram depicting exemplary systems for injecting cluster host information into an application container, in accordance with aspects of the present invention.

Turning to FIG. 4, a combination block/flowchart diagram 400 depicting exemplary systems for injecting host information into an application container in accordance with one embodiment of the invention is depicted. As illustrated in FIG. 4, the system may include an application container control agent 406 for instantiating running application containers listed as 426A, 426B, and 426n, based on predefined application templates listed as 404A, 404B, and 404n. The system may also include a runtime information injection agent 412 that dynamically collects information of cluster host 402 and calculates information to be injected into application containers 426A-n and consumed by their applications.

In addition, and as will be described in detail below, the application container control agent 406 may include and/or interact with an application container engine 408 to start and manage application containers 426A-n. The application container control agent 406 may also include and/or interact with a container template library 410 to store and provide reusable container templates, that may include software and configurations to run application containers based on the templates. In certain embodiments, instead of being an integral component, the application container engine 408 may be an external binary that is invoked by the application container control agent 406. Additionally, or alternatively, the container template library 410 may be an external repository for hosting container templates, and these container templates may be retrieved by the application container control agent 406 directly, or by the application container engine 408.

In certain embodiments, as shown with reference to numeral 1, the application container control agent 406 will instantiate an application container 426A-n based on an application template 404A-n (step 450). Such application templates 404A-n are fundamentally different from container templates hosted in the container template library 410. As will be described, while a container template packages necessary static information, such as the software of an application, its required libraries, configuration information, and a list of predefined users, the application template 404A-n specifies the run time behavior of the application container 426A-n, such as the execution user of the application, and further information required for launching an application container.

In some embodiments, the application container control agent 406 will delegate to a runtime information injection agent 412 the task of performing necessary information collection and calculations, as illustrated referencing numeral 2. The behavior of the runtime information injection agent 412 may be configured by an injection agent profile 414 and executed by information aggregation process 416. The information aggregation process 416 combines information collected from a transient application container 418 and information collected from the host 402 (step 452). As referenced in numeral 3, the information aggregation process 416 launches the transient application container 418 (step 454). This transient application container 418 generally utilizes the same container template as would be used by the working application containers 426A-n. The container template is generally an inert, immutable file that can serve as a snapshot of a given application container. These container templates can become large in size, and therefore, in certain embodiments, such a container template can be divided into common components, and different container templates may share a same set of common components.

In some embodiments, information of interest can be extracted from the transient application container 418 as referenced in numeral 4. Container specific data is collected from the transient application container 418, which serves as the information source that simulates a given container's run time environment based on a specific container template. The run time information injection agent 412 uses the transient application container 418 to retrieve this necessary run time information (step 456). This information 420 can be cached in a storage managed by the run time information injection agent 412 (step 458), referenced as numeral 5.

Additionally, or alternatively, to make sure the disk consumption of the cached data is within a reasonable bound, the information aggregation process 416 may delegate a space guard to prune off unnecessary files. The criterion and purging algorithm for such files can be further specified in injection agent profile 414. The purging algorithm may include several heuristic methods, such as Last-In-Last-Out (LILO), First-In-First-Out (FIFO), Least Recently Used (LRU), Most Recently Used (MRU), etc.

In some examples where the recency of this information is critical, a time guard component can additionally be enabled in the information aggregation process 416. This time guard component can be implemented in the simplest form as a timer (i.e., relying on an age of the information/data), or in more advanced form such as to extrapolate information based on a time-dependent logic. For example, in one embodiment, a certain property of a running container may be linear to time with a different initial value. This time guard may compute the most up-to-date value of a running application container 426A-n based on the cached information 420, and feed this data back to the run time information injection agent 412.

In some embodiments, as referenced by numeral 6, host information is collected from a host information data source 422, and such sources include, but, are not limited to, host configuration files, operating system information, local databases, environment variables, shared directories, running processes or commands, that provide data of the host environment (step 460). The information aggregation process 416 consumes the cached information 420 and host information, optionally according to the specification of the injection agent profile 414, and/or relevant section in the application template 404A-n as directed by the application container control agent 406, and combines these information items according to a prescribed logic. The combined (aggregated) information is then presented, for instance, in the form of a files termed as "Injected Info" 424A-n, and stored in the storage managed by the run time information injection agent 412, as referenced by numeral 7 (step 462).

Finally, the application container control agent 406 may then utilize the injected information files 424A-n to provision the working application containers 426A-n as referenced in numeral 8 (step 464). For certain application containers 426A-n having shared volumes on the cluster host 402, these injected information files 424A-n can be mounted into the working application container as auxiliary data volumes. In other examples, injected information files 424A-n can be presented as an additional common component into a container template, and new working containers may be started based on the new container template.

Continuing, FIG. 5 is a block diagram depicting a data structure 500 of the runtime information injection agent 412. Depending on the specific implementation, part or all of the configurations listed in the data structure 500 can be incorporated as part of the application template 404A-n, and vice versa.

The injection agent configuration establishes the protocol between the application container control agent 406 and the runtime information injection agent 412. In certain examples, this protocol is based on the source and target location of the injected information. The injection information source location can be set by application container control agent 406 to provide directions or hints to runtime information injection agent 412 on locating the host source of required data. In addition, the injection information target location is the path to a file or directory that is accessible by both application container control agent 406 and runtime information injection agent 412 to store the information to be injected.

Part of the efficiency of the runtime information injection agent 412 comes from its cache mechanism. Since the injection system might involve starting auxiliary containers for the purpose of extracting information, the extracted information can be cached for future reference. This poses several questions: how much information should the injection system store? How often should the information be refreshed? And how to resolve conflicts between information sets?

The space-related configuration as shown in data structure 500 provides the skeleton configuration needed to solve the storage consumption question. In some cases, the space guard might be disabled. This might be because the size of the storage where the cached information 420 is stored is unlimited or can be extended on demand, or the cached information 420 is guaranteed to converge in a large enough storage space. For example, in some scenarios, the application container control agent 406 might only use a finite set of static container templates and thereby only a few deterministic metrics are stored.

In some embodiments, once the space guard is enabled, the space-related configuration includes, but is not limited to, the following settings: a purge algorithm, a purge trigger and a purge goal. These configurations are all related to determining which information to cache and which information to discard (prune), and are not necessarily independent of one another: the purge algorithm focuses on answering the question of what information to discard, while the purge trigger signals the purge algorithm to determine when to start the purge. The purge goal then determines when to stop the purge. The settings may use various heuristics to establish each setting. For example, the purge algorithm may include the removal of the most recently created file in a Last-in-First-out (LILO) manner, or the least recently created file in a First-in-First-out (FIFO) manner. Modifications can be made to use the last access time or last modified time as an indicator for priority, instead of the creation time.

The purge trigger can be registered using a timer that regularly signals the purge process to start. Additionally, or alternatively, a storage consumption monitor can be registered to trigger such process. As will be discussed subsequently, instead of using a long-running background process to regularly screen the storage space, some types of lightweight scripts may be used as a one-time guard each time the runtime information injection agent 412 is triggered. Finally, the purge goal signals a purge process when to stop. Basic associated schemes may include, but are not limited to, a percentage of storage threshold being reached after the removal, a fixed amount of storage consumption threshold being reached after the removal, or a percentage of a previous files set has been removed to satisfy the purge goal.

The time-related configuration addresses the question on how often the information needs to be refreshed. In some scenarios, when a container template is expected never to change, then the cached information 420 will have an unlimited expiration time and thus the information once cached, will stay valid until it is discarded by the purge process. However, if the infinite validity of information cannot be guaranteed, then timer metrics should be specified and an expiration timer must be enforced to make sure the injected information is always up to date. As will be discussed, different timer metrics (such as creation time-based, modification time-based and access time-based) should be used with respect to the application domain, based on an information access pattern.

Finally, the information specific configuration solves the question of how to handle the information when the host source and container specific information are different. In one embodiment, a conflict resolution or resolve logic can be specified to serve as a generic handler wherein a few heuristics can be built-in into the logic, such as a logic to always use the host information to override container-specific information, or preserve the container information for the metrics in a pre-defined set. This too, will be further discussed, subsequently.

Figure 6:
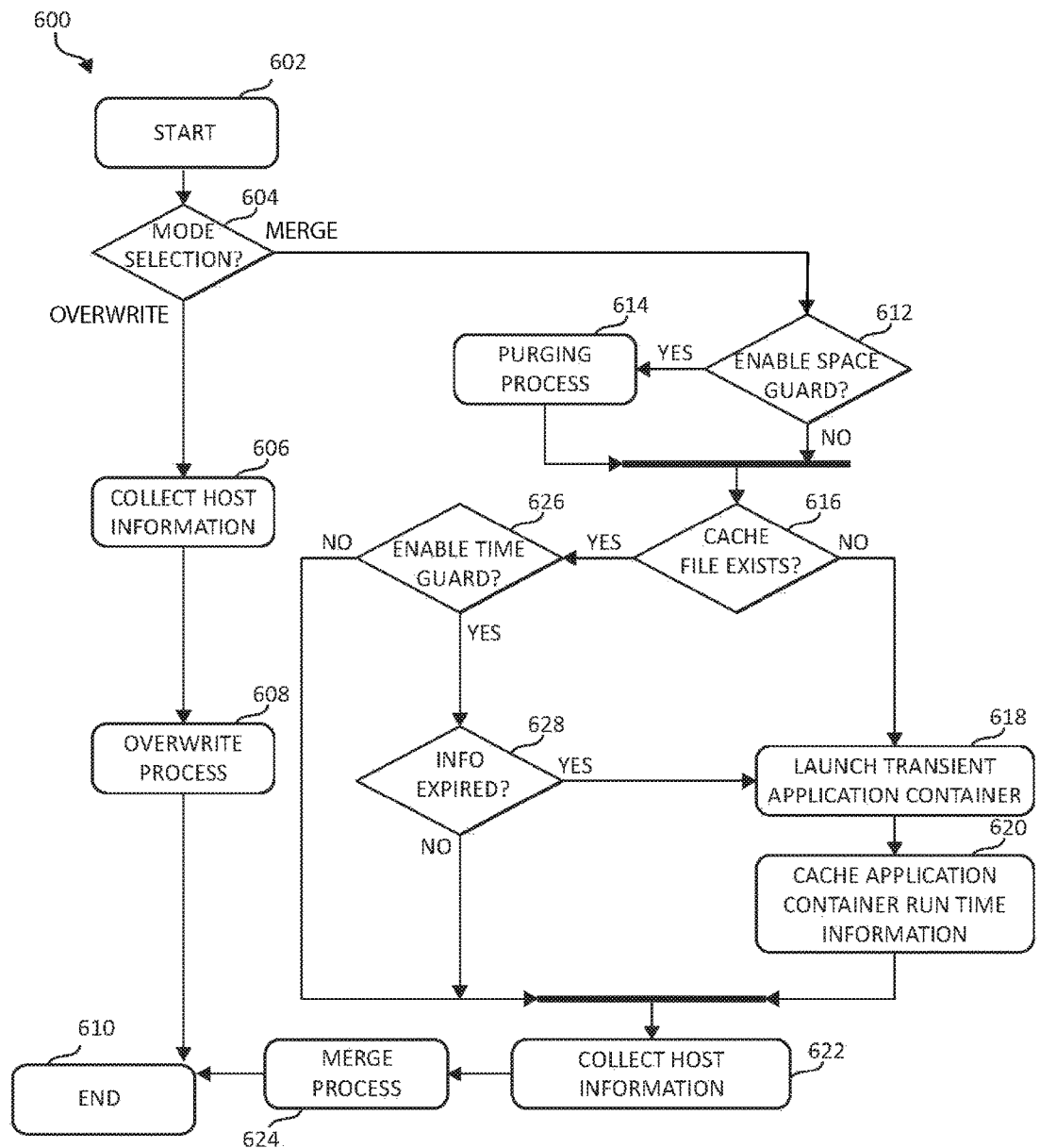
FIG. 6 is a flowchart diagram of an exemplary method for implementing an information injection agent, in accordance with aspects of the present invention.

Advancing, FIG. 6 is a flowchart diagram of an exemplary method 600 for implementing certain processes in the runtime information injection agent 412, in accordance with aspects of the present invention.

The method 600 starts (step 602) with a mode selection. The mode selection enables the runtime information injection agent 412 to have a fine-tuned aggregation behavior and apply appropriate weights on the importance of the different sources of extracted information. A determination of this mode selection (whether to overwrite or merge information) is performed at step 604. In some examples, if the selected mode is "overwrite", upon extracting or collecting information from the host 402 (step 606), this information extracted from the host 402 may be considered crucial while the container-specific extracted information is considered insignificant. In such cases, calculated information can overwrite directly container information (step 608) and be injected into the application container 426A-n at which point the method ends (step 610). Hence this mode is named "overwrite".

Returning to step 604, other examples require knowledge of both the host 402 and the given container, and both sets of information need to be merged together. One instance of this example is consistent with access control enforcement. While a container application has its own user space, the shared volume from the host will contaminate container user space with host access control rules. In cases where correctly enforcing both host access rules and container access rules is important, the running container needs to be aware of both the user space of the residing host and its own user space. This information must be merged together and exist within the application container 426A-n before its execution. In such case, a "merge" mode algorithm is performed.

When performing the merge mode operation, in one embodiment, an enable-space-guard condition is first checked (step 612) as to whether the space guard is enabled or not. This is a built-in logic to make sure the cached information 420 is bounded by an allocated space. In the case where storage consumption is monitored by an external logic or software component, the internal space guard can be disabled. When an internal space guard is enabled at step 612, a purging process will be invoked (step 614).

The purging process may be a simple, short running logic that removes cached information 420 each time the runtime information injection agent 412 is invoked, or a background process that periodically monitors the storage consumption of the cached information 420. The purging process can be optimized if cached information 420 is deterministic wherein several heuristics can be used. For instance, while the total size of all the cached files and directories is the most accurate metric of storage consumption, the computation of such size is usually fairly expensive. One way to optimize the computation is to use the number of files held to approximate the size. This operation is significantly cheaper than computing the size directly, since modern operating systems usually have the number of files associated to a directory as a member metadata. In a scenario where the size of the cached information 420 is well-bounded, only a few cached files need to be sampled to determine a size coefficient, which variable is then multiplied by the number of files created.

Either upon determining the space guard is not enabled in step 612, or after the purging process of step 614, a determination is made as to whether the required information has been already cached and has not been selected to be removed (step 616). If the information does not exist in cache, the method 600 moves to step 618. However, in certain scenarios, even if the information exists at step 616, a check is still required to determine whether the cached information 420 is up-to-date by identifying whether the time guard is enabled (step 626). If the time guard is not enabled, the validity of cached information 420 can be assumed and the cached information 420 may be used directly. In the case where a time guard is present or enabled at step 626, a determination is made as to whether the cached information 420 has expired (step 628). The details of this validity check will be described below, however if the information is indeed determined to be reasonably fresh, the previously generated information will be used to prepare the injected file.

In some embodiments, in the case where cached information 420 does not exist at step 616, or has outlived its expiration window at step 628, the container-specific information must be generated, collected, and cached. A transient application container 418 is launched (step 618) to serve as the prototype container and provide the runtime information injection agent 412 and application container control agent 406 the opportunity to investigate inside the container spaces. Depending on the actual implementation of such a transient container launch, the runtime information injection agent 412 and application container control agent 406 may sample information from, although not limited to, the process space, user space, mount space, inter process communication space, network space, and/or UNIX Timesharing System (UTS) space of the transient application container 418.

Moreover, depending on the specification of the working application container 426A-n, the runtime information injection agent 412 may additionally inspect the transient application container 418 to retrieve information about, and not limited to, resource reservations, the default LINUX capabilities and any environment settings for the processes running within the transient application container 418. After a set of information aforementioned is collected, the runtime information injection agent 412 may choose to cache this information for future reference (step 620). In any case, whether the time guard is not enabled at step 626, the information has not expired at step 628, or the transient application container 418 information is extracted and cached, corresponding host-sourced information is additionally collected and may be optionally cached (step 622). Finally, both sets of information (host-sourced and container sourced) are merged together and saved into the file (step 624) to be injected (step 610). Here too, this injected information may also be cached for future reference.

Figure 7:
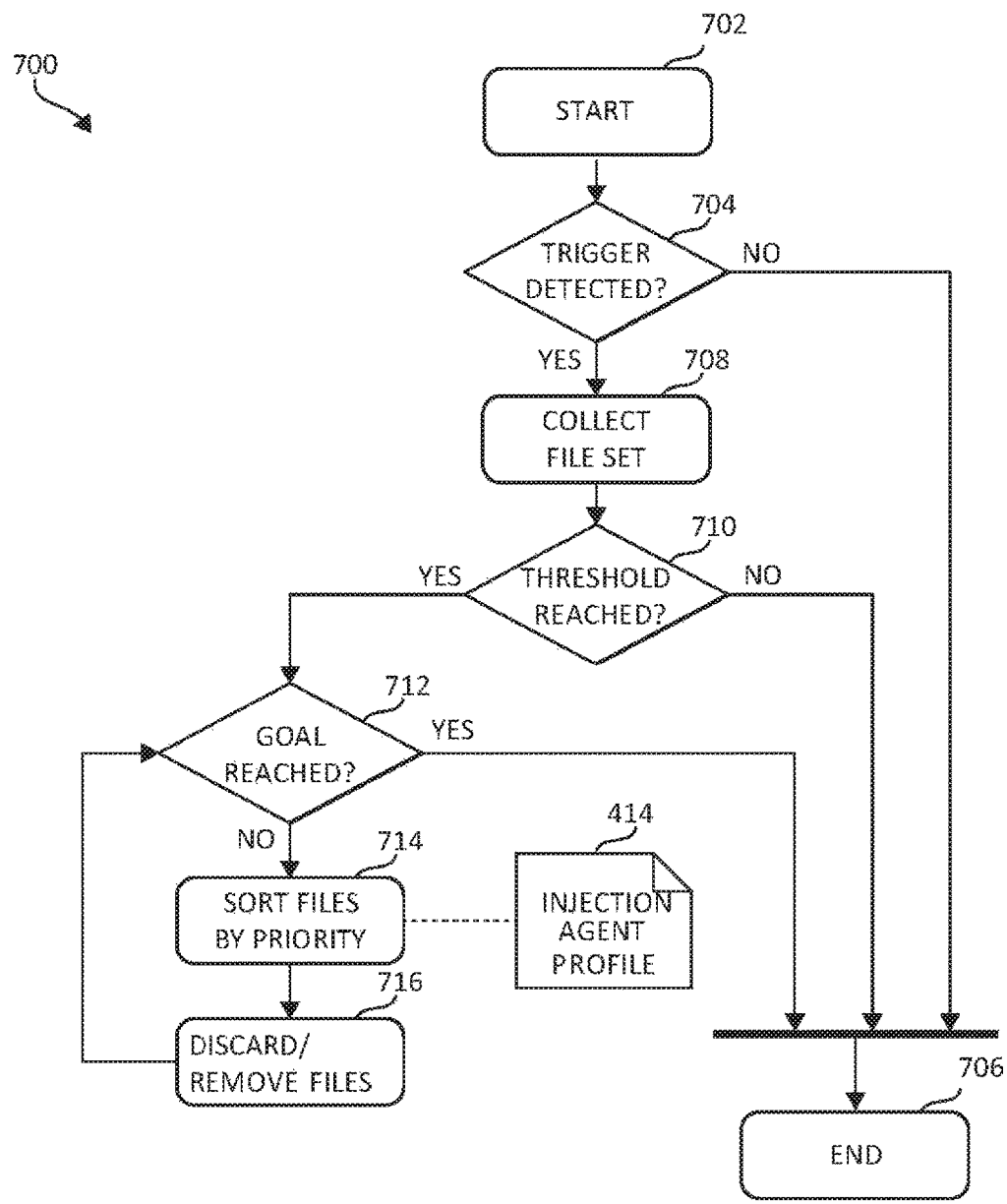
FIG. 7 is a flowchart diagram of an exemplary method for purging cached information of the information injection agent, in accordance with aspects of the present invention.

FIG. 7 is a flowchart diagram of an exemplary method 700 for purging cached information 420 of the runtime information injection agent 412, in accordance with aspects of the present invention. The purge process, as mentioned above, is an important component in the injection agent cache mechanism. The method 700 begins (step 702). In general, a timer can be used to signal the purge process to start, and such signal or trigger can be received by the purge process immediately or can be blocked until a next time the runtime information injection agent 412 is actually invoked. Therefore, a determination is made at step 704 as to whether the signal or trigger is detected. In situations where caching is disabled or the space guard process is inactive, the purge process can be short-circuited and bypassed for efficiency, and the method 700 ends (step 706).

Returning to step 704, if the signal or trigger is detected, cached information 420 is usually stored in a directory, and generally named in a specific way to enable mapping between the container template and the cached information 420. In some embodiments, the files are named with the following format: "container template name+information metric+auxiliary information". This nomenclature enables fast retrieval of cached information 420 when a similar application container 426A-n is started having the same container template and therefore, information of the same type is to be injected. With a well-defined naming convention, a regular expression can be leveraged to aggregate the cached information of certain container templates or of certain information metrics. The file set of cached information 420 will be collected according to the specification in the injection agent profile 414 (step 708).

Once the file set of cached information is collected and ready, the size of the file set is computed and compared against a predefined threshold (step 710). The purge process can be safely aborted if the file set is bounded within the threshold, and the method 700 ends (step 706). Otherwise at step 710, if the threshold is reached, the actual purge process is activated. A certain purging goal may be implemented as referenced by step 712, wherein if the goal is not reached, the file set is then sorted according to a predefined priority (step 714). The priority can be based on time, file size and/or an entropy value, depending on the application pattern and running environment. In one embodiment, for an application that reuses several base container templates while constantly building container templates on top of the base templates, a last access time can be used as the key to sort the files, and the most recently accessed files are discarded or removed (step 716). In another example, because the storage size is of high importance, the files may be sorted based on size, and some number of determined largest files may be removed to make space for multiple new smaller files. The method 700 then returns to step 712.

Entropy may be used as a key to sort the files by priority as well, since entropy can reflect how informative each cached piece of information is. Entropy may be either queried directly in certain operating systems, or computed programmatically. In some embodiments, the entropy value may be included in the filename within the auxiliary information field, such that the runtime information injection agent 412 may later use a regular expression to extract the value and sort the files accordingly with respect to the configuration in the injection agent profile 414. One example of the entropy values may comprise the checksum to a container template content regardless of the container template name. As will be explained below, when a file, for a certain information metric with respect to a certain container template name and a mutable version control identifier, already exists, its previous counterpart with a different checksum by default will be purged.

In most cases, information of certain types may be stored in a file of a predictable size. Therefore, the purge threshold and goal may be specified in terms of a number of cached files which generates a good approximation to keep the files within a reasonable size. The purge process may track progress by using a priority queue and remove only a few files at a time, or store file indexes in a list and remove a range of indexes and their associated files in one pass.

Figure 8:
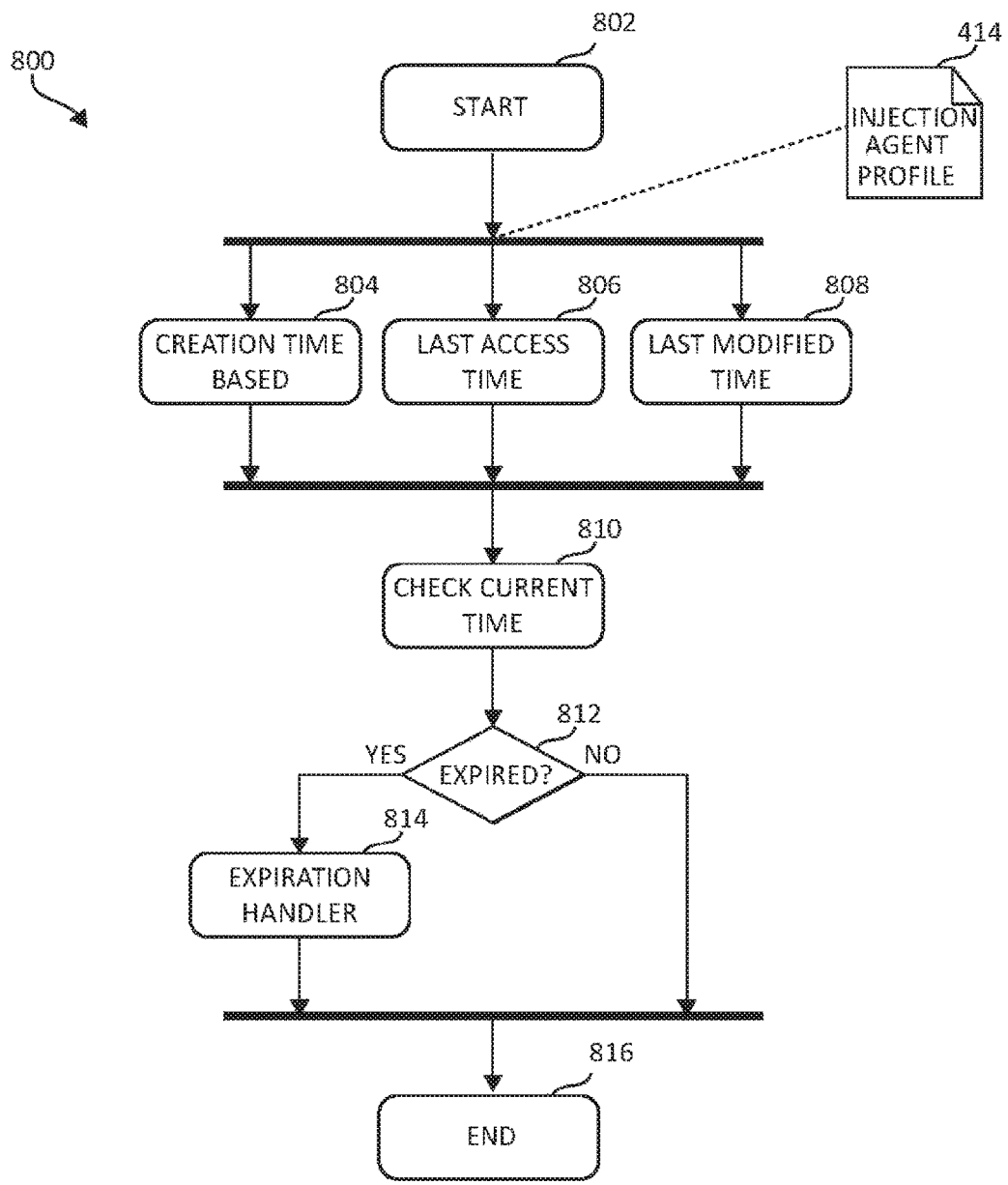
FIG. 8 is a flowchart diagram of an exemplary method for monitoring current data of the cached information, in accordance with aspects of the present invention.

FIG. 8 is a flowchart diagram of an exemplary method 800 for monitoring the recency of the data of the cached information, in accordance with aspects of the present invention. The refresh process is another important component of the cache mechanism of the application container information injection system. When the time guard component is enabled, the cached information 420 is guaranteed to be up to date with respect to a time metric defined in the injection agent profile 414. Thus, beginning at step 802, for example, on a POSIX system, these time metrics may be based on either a creation time (step 804), a last access time (step 806) and/or a last modified time of the cached information 420 (step 808). The creation time is perhaps the most simple and effective metric if the information to be retrieved from an application container 426A-n does not change over time and the information is never modified in the cached file. In some embodiments, the cached information 420 can be updated each time such information is accessed. For example, the runtime information injection agent 412 may store the number of running containers based on a given container template, which information will be updated inside the running container. As a result, the last access time can be used to indicate the freshness of the cached information 420. Moreover, in the example aforementioned, the last modified time may also be used to indicate how up-to-date the cached information 420 is as the runtime information injection agent updates the cached information 420 in-place.

After the time metric is collected, the runtime information injection agent 412 computes the difference between the current time and the time of previous choice (whether creation time, last access time, or last modified time) (step 810). When this computed difference does not exceed an allocated expiration window at 812, the method 800 ends (step 816). Conversely, when the computed difference exceeds the allocated expiration window at step 812, an expiration handler is invoked (step 814). The expiration handler may be implemented to simply remove the expired file, such that another transient container 418 may later be created and executed to regenerate the required information. In some examples, the cached information 420 can be deterministically regenerated and the expiration handler may also modify the information in place and update the cached file directly.

On a special note, if the cache mechanism is enabled, and the time guard and space guard are implemented in an asynchronous fashion with respect to the runtime information injection agent 412, special care must be given so that the cached information 420 currently being used will never be removed or expire. External locks may be used to prevent the file currently being injected from triggering the timer's update. Additionally, or alternatively, special characters may be appended in the name of a cached file and thus be excluded from the file set that the purge process would normally have collected by regular expression.

In some application container implementations, some version control primitives are built-in. These version control primitives might include mutable version control identifiers and immutable version control identifiers. The list of version control identifiers of each type may be optionally defined or declared in the injection agent profile 414. For immutable version control identifiers, upon creation, the content of the associated container templates will never change. Therefore, any update to the container templates will result in a new container template having the same name but with a new immutable version control identifier. Therefore, the time guard for container templates with immutable version control identifiers will by default be disabled, since the associated cached information 420 does not need to be refreshed.

For mutable version control identifiers, the content of the associated container template may be updated in place. For instance, some mutable version control identifiers may indicate the container template as being the "latest", and therefore the content of such container template will always be the most up-to-date content of all the container templates having the same name. Hence, for container templates with a mutable version control identifier, the time guard is by default enabled, and may also be marked as always expired or rather list a short expiration window. Additionally, for container templates having a mutable version control tag, when the new file of cached information 420 is created, the checksum of this image may be optionally indexed in the filename so that the space guard can use this information as a hint when sorting the files to be purged.

Figure 9:
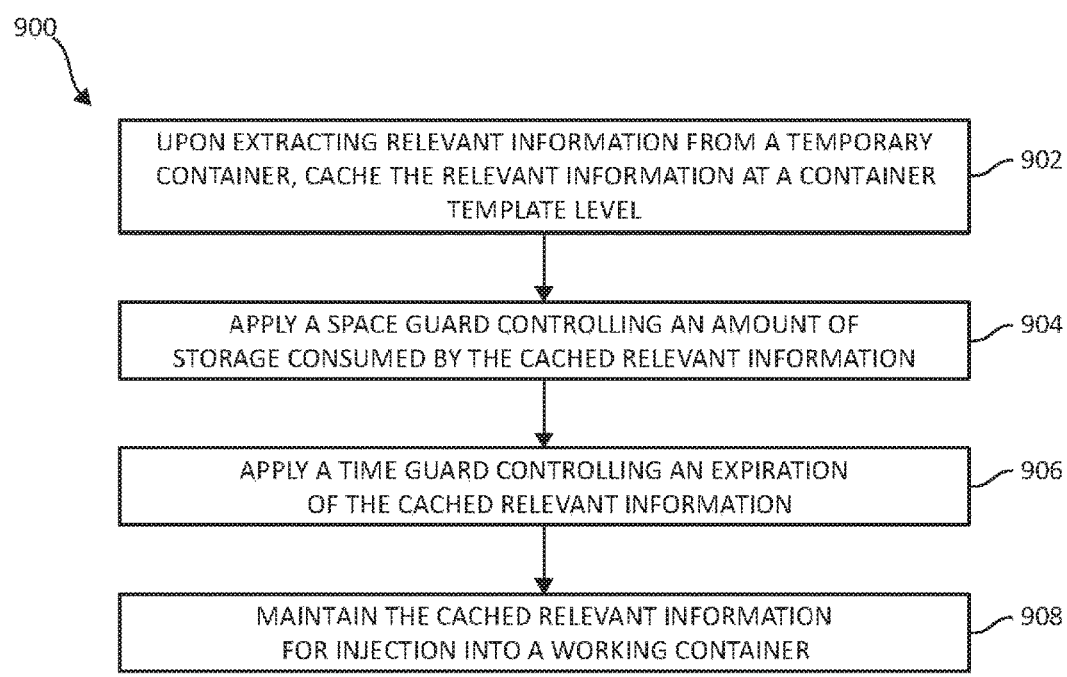
FIG. 9 is a flowchart diagram of an exemplary method for caching extracted information from application containers by one or more processors, again in accordance with aspects of the present invention.

Concluding, FIG. 9 is a flowchart diagram of an exemplary method 900 for caching extracted information from application containers by one or more processors, again in accordance with aspects of the present invention.

The method 900 begins when, upon extracting relevant information from a temporary container, the relevant information is cached at a container template level (step 902). A space guard is applied controlling an amount of storage consumed by the cached relevant information (step 904), and a time guard is applied controlling an expiration of the cached relevant information (step 906). The cached relevant information is maintained for injection into a working container (step 908). This information is used to efficiently propagate configuration attributes and other information of an application run inside the working container.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a MEMORY STICK, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for caching extracted information from application containers, by a processor device, comprising:
   upon extracting relevant information from a temporary container, caching the relevant information; wherein the cached relevant information comprises runtime information and characteristics based upon a specific container template, and is stored as a file in a cache of an information injection agent;
   applying a space guard to the cache controlling an amount of storage consumed by the cached relevant information by defining a purge process for pruning the cached relevant information stored in the cache, and providing a timer indicating a signal to start the purge process, wherein the signal is processed immediately or deferred until a next time the A information injection agent is invoked, and further wherein, when the cache is disabled or the space guard is inactive, the purge process is bypassed;
   applying a time guard to the cache controlling an expiration of the cached relevant information; and
   injecting the cached relevant information into a working container.

2. The method of claim 1, further including aggregating the cached relevant information including predetermined container templates and predetermined information metrics into a collected file set;
   computing a size of the file set;
   comparing the size of the file set against a predefined threshold;
   aborting the purge process if the file set is bounded within the predefined threshold; and
   if the file set is not bounded within the threshold, activating the purge process to:
      sort the file set according to a predefined priority, wherein the priority is based on the predetermined information metrics including at least one of a time, the size of the file, and an entropy value.

3. The method of claim 2, further including identifying candidate files for the purge process using a predetermined criterion, a predetermined purge threshold and a purge goal; and
   tracking the purge process by using a priority queue and removing only a subset of the identified candidate files, or storing indexes of the identified candidate files in a list and removing a range of the indexes and associated identified candidate files.

4. The method of claim 1, wherein applying the time guard further includes defining a refresh process for the information injection agent cache using a time metric defined in a profile of the information injection agent, the time metric based on one of a creation time, a last access time or a last modified time of the cached relevant information.

5. The method of claim 4, further including, in response to collecting the time metric, computing a difference between a current time and the time metric;
   upon the difference exceeding an allocated expiration window, invoking an expiration handler to remove an expired file of the cached relevant information thereby enabling another temporary container to be created to regenerate new relevant information; and
   using external locks to prevent a file of the cached relevant information currently being injected from being removed or marked as expired using an update of the time metric when the time guard and the space guard are implemented in an asynchronous fashion with respect to the information injection agent.

6. A system for caching extracted information from application containers, the system comprising:
   an information injection agent, the information injection agent including a cache;
   a memory device; and
   a processor device executing instructions stored in the memory device, wherein the processor device:
      upon extracting relevant information from a temporary container, caches the relevant information; wherein the cached relevant information comprises runtime information and characteristics based upon a specific container template, and is stored as a file in the cache of the information injection agent;
      applies a space guard to the cache controlling an amount of storage consumed by the cached relevant information by defining a purge process for pruning the cached relevant information stored in the cache, and providing a timer indicating a signal to start the purge process, wherein the signal is processed immediately or deferred until a next time the information injection agent is invoked, and further wherein, when the cache is disabled or the space guard is inactive, the purge process is bypassed;
      applies a time guard to the cache controlling an expiration of the cached relevant information; and
      injects the cached relevant information into a working container.

7. The system of claim 6, wherein the processor device aggregates the cached relevant information including predetermined container templates and predetermined information metrics into a collected file set;
   computes a size of the file set;
   compares the size of the file set against a predefined threshold;
   aborts the purge process if the file set is bounded within the predefined threshold; and
   if the file set is not bounded within the threshold, activates the purge process to:
      sort the file set according to a predefined priority, wherein the priority is based on the predetermined information metrics including at least one of a time, the size of the file, and an entropy value.

8. The system of claim 7, wherein the processor device identifies candidate files for the purge process using a predetermined criterion, a predetermined purge threshold and a purge goal; and
   tracks the purge process by using a priority queue and removing only a subset of the identified candidate files, or storing indexes of the identified candidate files in a list and removing a range of the indexes and associated identified candidate files.

9. The system of claim 6, wherein applying the time guard further includes defining a refresh process for the information injection agent cache using a time metric defined in a profile of the information injection agent, the time metric based on one of a creation time, a last access time or a last modified time of the cached relevant information.

10. The system of claim 9, wherein the processor device, in response to collecting the time metric, computes a difference between a current time and the time metric;
   upon the difference exceeding an allocated expiration window, invokes an expiration handler to remove an expired file of the cached relevant information thereby enabling another temporary container to be created to regenerate new relevant information; and
   uses external locks to prevent a file of the cached relevant information currently being injected from being removed or marked as expired using an update of the time metric when the time guard and the space guard are implemented in an asynchronous fashion with respect to the information injection agent.

11. A computer program product for caching extracted information from application containers, by a processor device, the computer program product embodied on a non-transitory computer-readable storage medium having computer-readable program code portions stored therein, the computer-readable program code portions comprising:
   an executable portion that, upon extracting relevant information from a temporary container, caches the relevant information; wherein the cached relevant information comprises runtime information and characteristics based upon a specific container template, and is stored as a file in a cache of an information injection agent;
   an executable portion that applies a space guard to the cache controlling an amount of storage consumed by the cached relevant information by defining a purge process for pruning the cached relevant information stored in the cache, and providing a timer indicating a signal to start the purge process, wherein the signal is processed immediately or deferred until a next time the information injection agent is invoked, and further wherein, when the cache is disabled or the space guard is inactive, the purge process is bypassed;
   an executable portion that applies a time guard to the cache controlling an expiration of the cached relevant information; and
   an executable portion that injects the cached relevant information into a working container.

12. The computer program product of claim 11, the computer-readable program code portions further including an executable portion that:
   aggregates the cached relevant information including predetermined container templates and predetermined information metrics into a collected file set;
   computes a size of the file set;
   compares the size of the file set against a predefined threshold;
   aborts the purge process if the file set is bounded within the predefined threshold; and
   if the file set is not bounded within the threshold, activates the purge process to:
      sort the file set according to a predefined priority, wherein the priority is based on the predetermined information metrics including at least one of a time, the size of the file, and an entropy value.

13. The computer program product of claim 12, the computer-readable program code portions further including an executable portion that identifies candidate files for the purge process using a predetermined criterion, a predetermined purge threshold and a purge goal; and
   an executable portion that tracks the purge process by using a priority queue and removing only a subset of the identified candidate files, or storing indexes of the identified candidate files in a list and removing a range of the indexes and associated identified candidate files.

14. The computer program product of claim 11, wherein applying the time guard further includes defining a refresh process for the information injection agent cache using a time metric defined in a profile of the information injection agent, the time metric based on one of a creation time, a last access time or a last modified time of the cached relevant information.

15. The computer program product of claim 14, the computer-readable program code portions further including an executable portion that, in response to collecting the time metric, computes a difference between a current time and the time metric;
   an executable portion that, upon the difference exceeding an allocated expiration window, invokes an expiration handler to remove an expired file of the cached relevant information thereby enabling another temporary container to be created to regenerate new relevant information; and
   an executable portion that uses external locks to prevent a file of the cached relevant information currently being injected from being removed or marked as expired using an update of the time metric when the time guard and the space guard are implemented in an asynchronous fashion with respect to the information injection agent.

* * * * *